United States Patent [19]
Vartanov et al.

[11] Patent Number: 5,979,859
[45] Date of Patent: Nov. 9, 1999

[54] ROTATING CHRISTMAS TREE STAND

[76] Inventors: Arshavir Vartanov; Sergey Vartanov, both of 1123 Pacific, 1st Floor, Kansas City, Mo. 64106

[21] Appl. No.: 08/976,232

[22] Filed: Nov. 21, 1997

[51] Int. Cl.⁶ .................................................. F16M 13/00
[52] U.S. Cl. .............................................. 248/522; 47/40.5
[58] Field of Search ................................ 248/524, 522, 248/527; 47/40.5

[56] References Cited

U.S. PATENT DOCUMENTS

| | | | |
|---|---|---|---|
| 1,241,127 | 9/1917 | Krapf, Jr. | 248/522 X |
| 1,372,777 | 3/1921 | Samuel et al. | 248/522 X |
| 2,416,802 | 3/1947 | Roung | 248/522 X |
| 3,042,350 | 7/1962 | Lencioni | 248/522 X |
| 3,697,026 | 10/1972 | Hambrick | 248/524 |
| 5,190,261 | 3/1993 | Tetting | 248/522 |
| 5,575,110 | 11/1996 | Couture | 47/40.5 |
| 5,647,569 | 7/1997 | Sofy | 248/522 |

*Primary Examiner*—Derek J. Berger
*Assistant Examiner*—Long Dinh Phan
*Attorney, Agent, or Firm*—Joseph N. Breaux

[57] ABSTRACT

A rotating Christmas tree stand that includes a rotating electric supply socket to provide electrical power to the lights decorating the Christmas tree; that includes a fluid reservoir for supplying fluid to the Christmas tree; that includes a mixing mechanism for mixing fertilizing agents into the fluid within the fluid reservoir; and that includes a stand assembly and a rotating tree support assembly rotatably supported on the stand assembly.

16 Claims, 4 Drawing Sheets

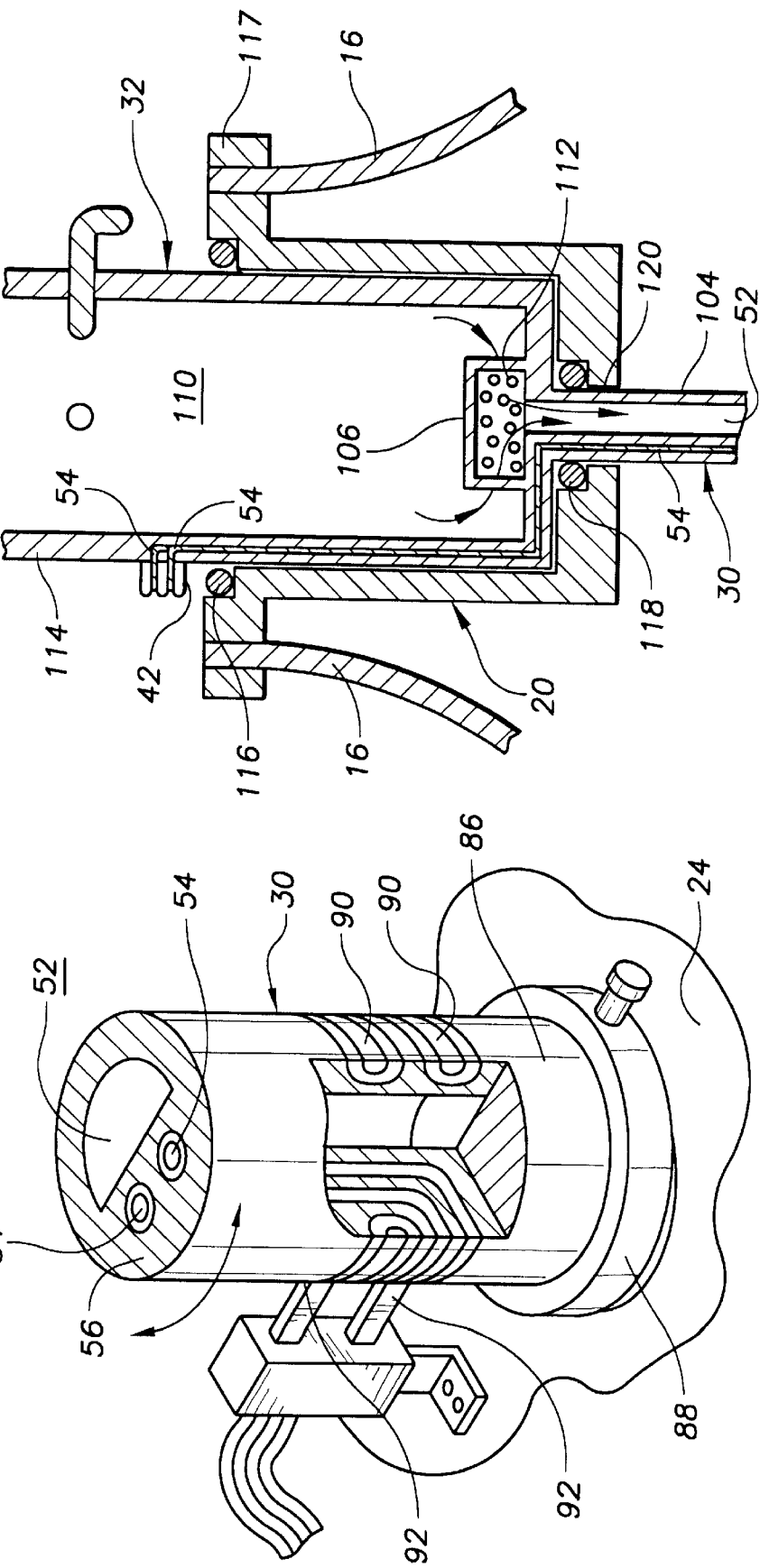

ROTATING CHRISTMAS TREE STAND

TECHNICAL FIELD

The present invention relates to Christmas tree stands and more particularly to a rotating Christmas tree stand that includes a stand assembly and a rotating tree support assembly rotatably supported on the stand assembly; the stand assembly including support legs, a leg support ring, a support canister, a detachable fluid reservoir assembly, and an electric drive motor; the leg support ring being secured to a mid-portion of each of the support legs; the support canister being attached to an upper end of each of the support legs and including a cylinder receiving cavity, an upper canister bearing assembly, a support canister fluid level viewing window, a lower canister bearing assembly, and a shaft aperture; the detachable fluid reservoir assembly including a lower reservoir member, an upper reservoir member, a mixing blade assembly, a lower reservoir bearing, a lower seal, an upper seal, an upper reservoir bearing, a plurality of reservoir locking buckles for securing the upper reservoir member to the lower reservoir member, and an air vent valve provided on the upper reservoir member for releasing air from a reservoir chamber formed by an upper chamber cavity of the upper reservoir member and a lower chamber cavity of the lower reservoir member; the mixing blade assembly including a number of mixing blades radiating from a friction fitting; the rotating tree support assembly including a tubular drive shaft and a trunk receiving support cylinder; the trunk receiving support cylinder including a receiving cylinder water level viewing window, a trunk receiving cavity, a tree support base extending upwardly into the trunk receiving cavity, a plurality of trunk securing screw mechanisms, and an electric supply socket; the tubular drive shaft including a fluid passageway formed along an upper portion of the tubular drive shaft and into fluid communication with the trunk receiving cavity of the trunk receiving support cylinder, a fluid flow hole formed through the sidewall of the tubular drive shaft and into connection with the fluid passageway, two circumferential conductor contacts formed around a lower shaft end of the tubular drive shaft, two electrical conductors routed through the wall of the tubular drive shaft and in electrical connection between the circumferential conductor contacts and the electric supply socket, and a solid lower shaft end sealing the lower end of the fluid passageway; the electric drive motor including two contact brushes and a shaft coupling ring; one contact brush being in sliding electric contact with each of the conductor contacts; the shaft coupling ring detachably coupling the drive motor to the tubular drive shaft; an upper end of the tubular drive shaft being integrally formed with the trunk receiving support cylinder; the cylinder receiving cavity of the support canister being sized to receive at least a portion of the tree receiving support cylinder therein.

BACKGROUND ART

It is often desirable to display a decorated Christmas tree. Although the entire Christmas tree is typically decorated, it is often difficult to find a location within a home or other building that provides views of all sides of the Christmas tree. It would be a benefit, therefore, to have a Christmas tree stand that was rotatable to allow for display of the entire Christmas tree. Because many Christmas trees are decorated with electric lights, it would be a further benefit to have a rotating Christmas tree stand that included a rotating electric supply socket to provide electrical power to the lights decorating the Christmas tree without the worry of the electrical supply wires becoming tangled. Because live or fresh Christmas trees typically last longer when provided with fluids, it would be a further benefit to have a Christmas tree stand that included a fluid reservoir for supplying fluid to the tree. In addition, because it is also considered beneficial to add fertilizing agents to the fluid supplied to the tree, it would also be a benefit to have a mixing mechanism for mixing fertilizing agents into the fluid within the fluid reservoir.

GENERAL SUMMARY DISCUSSION OF INVENTION

It is thus an object of the invention to provide a rotating Christmas tree stand that includes a rotating electric supply socket to provide electrical power to the lights decorating the Christmas tree.

It is a further object of the invention to provide a rotating Christmas tree stand that includes a fluid reservoir for supplying fluid to the Christmas tree.

It is a still further object of the invention to provide a rotating Christmas tree stand that includes a mixing mechanism for mixing fertilizing agents into the fluid within a fluid reservoir.

It is a still further object of the invention to provide a rotating Christmas tree stand that includes a stand assembly and a rotating tree support assembly rotatably supported on the stand assembly; the stand assembly including support legs, a leg support ring, a support canister, a detachable fluid reservoir assembly, and an electric drive motor; the leg support ring being secured to a mid-portion of each of the support legs; the support canister being attached to an upper end of each of the support legs and including a cylinder receiving cavity, an upper canister bearing assembly, a support canister fluid level viewing window, a lower canister bearing assembly, and a shaft aperture; the detachable fluid reservoir assembly including a lower reservoir member, an upper reservoir member, a mixing blade assembly, a lower reservoir bearing, a lower seal, an upper seal, an upper reservoir bearing, a plurality of reservoir locking buckles for securing the upper reservoir member to the lower reservoir member, and an air vent valve provided on the upper reservoir member for releasing air from a reservoir chamber formed by an upper chamber cavity of the upper reservoir member and a lower chamber cavity of the lower reservoir member; the mixing blade assembly including a number of mixing blades radiating from a friction fitting; the rotating tree support assembly including a tubular drive shaft and a trunk receiving support cylinder; the trunk receiving support cylinder including a receiving cylinder water level viewing window, a trunk receiving cavity, a tree support base extending upwardly into the trunk receiving cavity, a plurality of trunk securing screw mechanisms, and an electric supply socket; the tubular drive shaft including a fluid passageway formed along an upper portion of the tubular drive shaft and into fluid communication with the trunk receiving cavity of the trunk receiving support cylinder, a fluid flow hole formed through the sidewall of the tubular drive shaft and into connection with the fluid passageway, two circumferential conductor contacts formed around a lower shaft end of the tubular drive shaft, two electrical conductors routed through the wall of the tubular drive shaft and in electrical connection between the circumferential conductor contacts and the electric supply socket, and a solid lower shaft end sealing the lower end of the fluid passageway; the electric drive motor including two contact brushes and a shaft coupling ring; one contact brush being in sliding electric contact with each of the conductor contacts; the shaft coupling ring detachably coupling the drive motor to the tubular drive shaft; an upper end of the tubular drive shaft being integrally formed with the trunk receiving support cylinder; the cylinder receiving cavity of the support canister being sized to receive at least a portion of the tree receiving support cylinder therein.

It is a still further object of the invention to provide a rotating Christmas tree stand that accomplishes some or all of the above objects in combination.

Accordingly, a rotating Christmas tree stand is provided. The rotating Christmas tree stand includes a stand assembly and a rotating tree support assembly rotatably supported on the stand assembly; the stand assembly including support legs, a leg support ring, a support canister, a detachable fluid reservoir assembly, and an electric drive motor; the leg support ring being secured to a mid-portion of each of the support legs; the support canister being attached to an upper end of each of the support legs and including a cylinder receiving cavity, an upper canister bearing assembly, a support canister fluid level viewing window, a lower canister bearing assembly, and a shaft aperture; the detachable fluid reservoir assembly including a lower reservoir member, an upper reservoir member, a mixing blade assembly, a lower reservoir bearing, a lower seal, an upper seal, an upper reservoir bearing, a plurality of reservoir locking buckles for securing the upper reservoir member to the lower reservoir member, and an air vent valve provided on the upper reservoir member for releasing air from a reservoir chamber formed by an upper chamber cavity of the upper reservoir member and a lower chamber cavity of the lower reservoir member; the mixing blade assembly including a number of mixing blades radiating from a friction fitting; the rotating tree support assembly including a tubular drive shaft and a trunk receiving support cylinder; the trunk receiving support cylinder including a receiving cylinder water level viewing window, a trunk receiving cavity, a tree support base extending upwardly into the trunk receiving cavity, a plurality of trunk securing screw mechanisms, and an electric supply socket; the tubular drive shaft including a fluid passageway formed along an upper portion of the tubular drive shaft and into fluid communication with the trunk receiving cavity of the trunk receiving support cylinder, a fluid flow hole formed through the sidewall of the tubular drive shaft and into connection with the fluid passageway, two circumferential conductor contacts formed around a lower shaft end of the tubular drive shaft, two electrical conductors routed through the wall of the tubular drive shaft and in electrical connection between the circumferential conductor contacts and the electric supply socket, and a solid lower shaft end sealing the lower end of the fluid passageway; the electric drive motor including two contact brushes and a shaft coupling ring; one contact brush being in sliding electric contact with each of the conductor contacts; the shaft coupling ring detachably coupling the drive motor to the tubular drive shaft; an upper end of the tubular drive shaft being integrally formed with the trunk receiving support cylinder; the cylinder receiving cavity of the support canister being sized to receive at least a portion of the tree receiving support cylinder therein. In a preferred embodiment, the Christmas tree stand includes a remote control mechanism including a remote receiving unit coupled in controlling connection with the drive motor and a hand held remote control transmitter unit.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 5 is a detail partial cutaway view of the motor coupling end of the tubular drive shaft showing the two electrical conductors routed through the wall of the tubular drive shaft; the two circumferential conductor contacts; the two contact brushes, one contact brush in contact with each of the conductor contacts; the shaft coupling ring coupling the drive motor to the tubular drive shaft; and the solid lower shaft end sealing the lower end of the fluid passageway.

FIG. 6 is a cross sectional detail view showing the support canister, the upper canister bearing assembly, the lower canister bearing assembly, the shaft aperture, and two of the three support legs of the stand assembly; and the upper end of the tubular drive shaft integrally formed with the trunk receiving support cylinder and showing the tree support base positioned at the bottom of the tree trunk receiving cavity, two of the three trunk securing screw mechanisms each including a threaded securing aperture and a threaded securing screw, and the two electrical conductors routed through the cylinder sidewall and connected to the electric supply socket.

EXEMPLARY MODE FOR CARRYING OUT THE INVENTION

Figure 1:
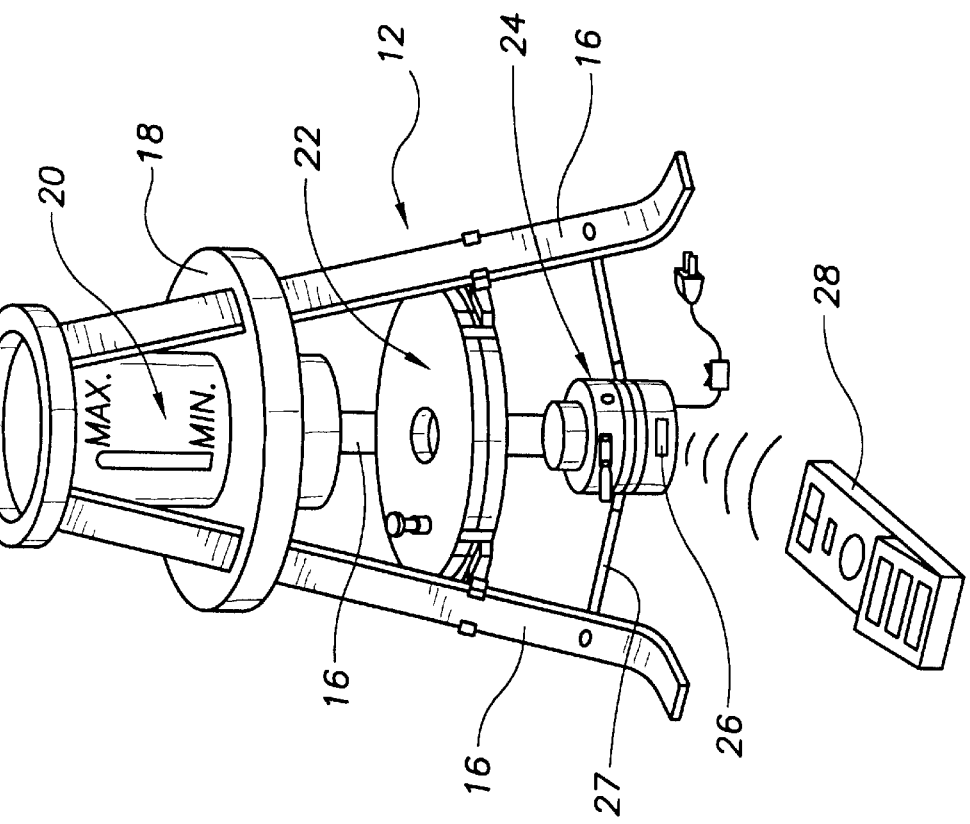
FIG. 1 is a perspective view of an exemplary embodiment of the rotating Christmas tree stand of the present invention showing the stand assembly including the support legs, the leg support ring, the support canister, the detachable fluid reservoir assembly, the drive motor, and the remote control mechanism including the receiving unit and the hand held transmitter unit; and the rotating tree support assembly including the tubular drive shaft and the trunk receiving support cylinder.
Figure 2:
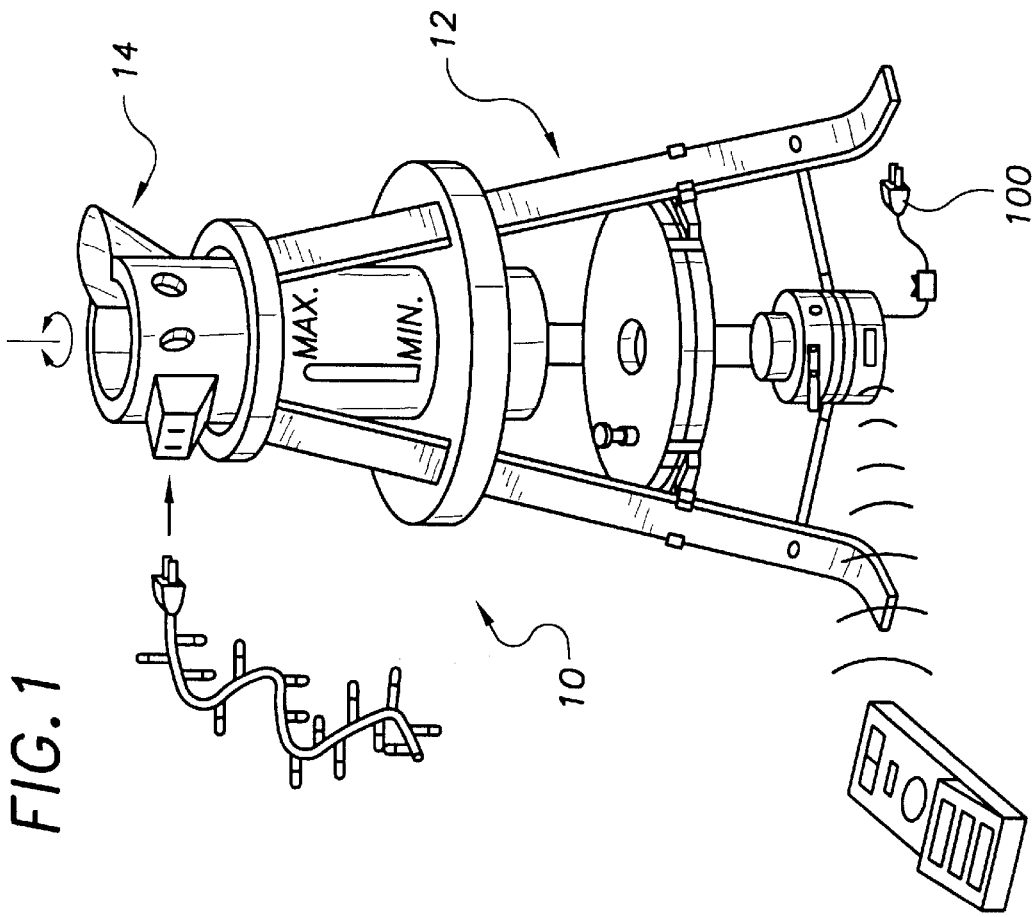
FIG. 2 is a perspective view of the stand assembly of the exemplary rotating Christmas tree stand of FIG. 1 in isolation showing the three support legs, the leg support ring, the support canister, the detachable fluid reservoir assembly, the drive motor, and the receiving unit of the remote control mechanism.

FIG. 1 shows an exemplary embodiment of the rotating Christmas tree stand of the present invention generally designated by the numeral 10. Christmas tree stand 10 includes a stand assembly, generally designated 12; and a rotating tree support assembly, generally designated 14. With reference to FIG. 2, stand assembly 12 includes three metal support legs 16; a leg support ring 18; a support canister, generally designated 20; a detachable fluid reservoir assembly, generally designated 22; an electric drive motor, generally designated 24, conventionally equipped with an on/off switch and in-line fusing and rigidly secured between support legs 16 by a stabilizing bracket 27; and a conventional infrared remote control mechanism including a receiving unit 26 and a hand held transmitter unit 28.

Figure 4:
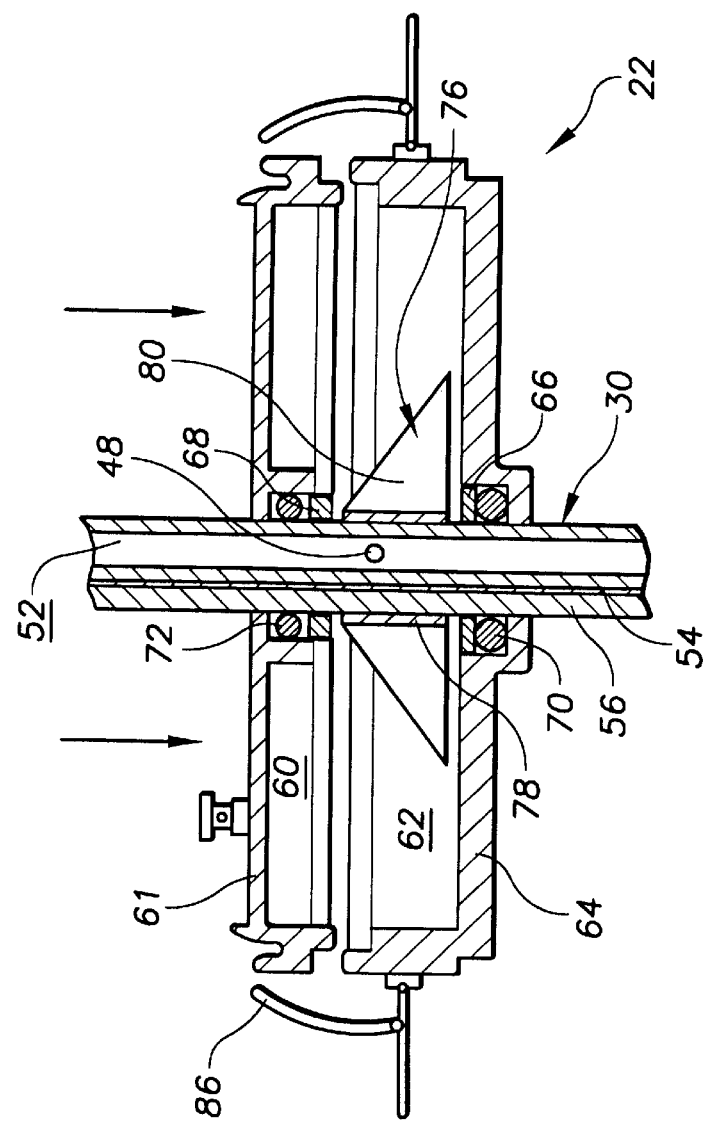
FIG. 4 is a detail cross sectional view of a mid-section of the tubular drive shaft and the detachable fluid reservoir assembly showing the fluid passageway formed through the tubular drive shaft; one of the two electrical conductors routed through the wall of the tubular drive shaft; the fluid flow hole formed through the sidewall of the tubular drive shaft; the lower reservoir bearing; the lower seal of the lower reservoir member positioned onto the tubular drive shaft; the friction fitting of the mixing blade assembly positioned onto the tubular drive shaft; the upper seal of the upper reservoir member positioned onto the drive shaft; the upper reservoir bearings; two of the reservoir locking buckles used to secure the upper reservoir member to the lower reservoir member; and the air vent valve provided on the upper reservoir member for releasing air from the reservoir chamber formed by the upper chamber cavity of the upper reservoir member and the lower chamber cavity of the lower reservoir member.
Figure 3:
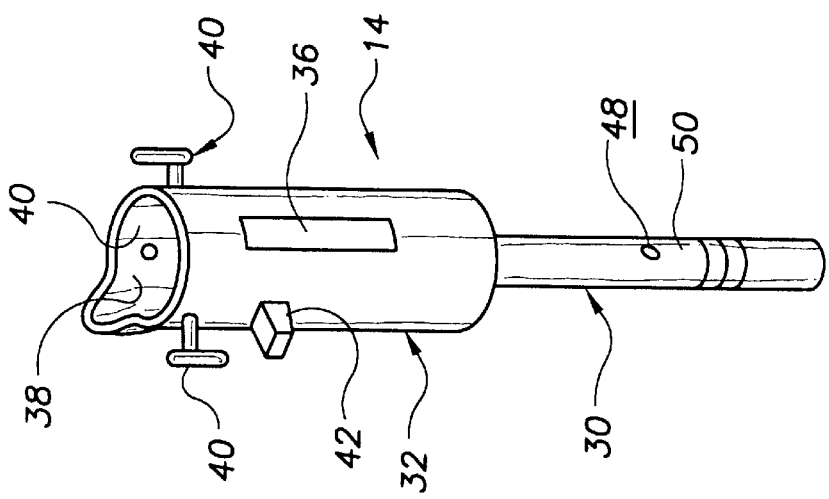
FIG. 3 is a perspective view of the rotating tree support assembly of the rotating Christmas tree stand of FIG. 1 in isolation showing the tubular drive shaft including the fluid flow hole, formed through the sidewall of the tubular drive shaft and into connection with the fluid passageway formed through the tubular drive shaft, and the two circumferential conductor contacts formed around the lower shaft end of the tubular drive shaft; and the trunk receiving support cylinder including the water level viewing window, the funnel shaped fill lip, the three trunk securing screw mechanisms, and the electric supply socket.

With reference to FIG. 3, rotating tree support assembly 14 includes a tubular metal drive shaft, generally designated 30; and a trunk receiving support cylinder, generally designated 32. Trunk receiving support cylinder 32 is of metal construction and includes a water level viewing window 36, a funnel shaped fill lip 38, three trunk securing screw mechanisms 40, and an electric supply socket 42. Tubular drive shaft 30 includes a fluid flow hole 48, formed through a sidewall 50 of tubular drive shaft 32 and, with reference now to FIG. 4, into connection with a fluid passageway 52 formed through tubular drive shaft 30. FIG. 4 shows a cross section of a mid-section of the tubular drive shaft 30 and detachable fluid reservoir assembly 22. Tubular drive shaft 30 has two electrical conductors 54, both shown in FIG. 5, that are routed through the wall 56 of tubular drive shaft 30. Fluid flow hole 48 is formed in a position along tubular drive shaft 30 such that flow hole 48 is in fluid communication with a reservoir chamber 58 (See FIG. 7) formed by the convergence of an upper chamber cavity 60 of an upper reservoir member 61 and a lower chamber cavity 62 of a lower reservoir member 64. Tubular drive shaft 30 passes through and is rotatable with respect to detachable reservoir member 22. A fluid tight seal is formed between tubular drive shaft 30 and detachable reservoir member 22 by a lower oil seal 66 and an upper oil seal 68. Rotation between tubular drive shaft 30 and detachable reservoir member 22 is aided by use of a lower reservoir bearing 70 and an upper reservoir bearing 72. A mixing blade assembly, generally designated 76, is positioned within detachable reservoir member 22 to provide a mixing mechanism for mixing fluids and fertilizing agents within the reservoir chamber formed by the convergence of upper chamber cavity 60 and lower chamber cavity 62. Mixing blade assembly 76 includes a friction fitting 78 that friction fits onto tubular drive shaft 30 and a number of mixing blades 80 that extend radially outward from friction fitting 78. In this embodiment upper reservoir member 61 and lower reservoir member 64 are sealingly secured together through the use of a number of reservoir locking buckles 86.

With reference now to FIG. 5, tubular drive shaft 30 has a solid lower end 86 that seals fluid passageway 52 and is rigidly coupled to drive motor 24 by a coupling ring 88. Two circumferential conductor contacts 90 are provided around tubular drive shaft 30 that are each electrically connected to one of the electrical conductors 54 that are routed through wall 56. Two contact brushes 92 are supported from drive motor 24 and are each held in sliding electrical contact with one of the two conductor contacts 90. The two contact brushes 92 are also each electrically connected to the power supply plug 100 (FIG. 1) that supplies electrical power to drive motor 24.

With reference to FIG. 6, an upper end 104 of tubular drive shaft 30 is integrally formed with trunk receiving cylinder 32. Trunk receiving cylinder 32 includes a tree support base 106 that is positioned at the bottom of the tree trunk receiving cavity 110. Tree support base 106 has a number of flow apertures 112 through which fluid communication between fluid passageway 52 and tree trunk receiving cavity 110 is achieved. Both electrical conductors 54 are routed through the cylinder sidewall 114 and are electrically connected to electric supply socket 42.

Trunk receiving cylinder 32 is supported within support canister 20 by an upper canister bearing assembly 116 and a lower canister bearing assembly 118. Tubular drive shaft 30 is rotatably positioned through a shaft aperture 120 provided for that purpose. Each of the three support legs 16 is secured to the upper lip 117 of support canister 20.

Figure 7:
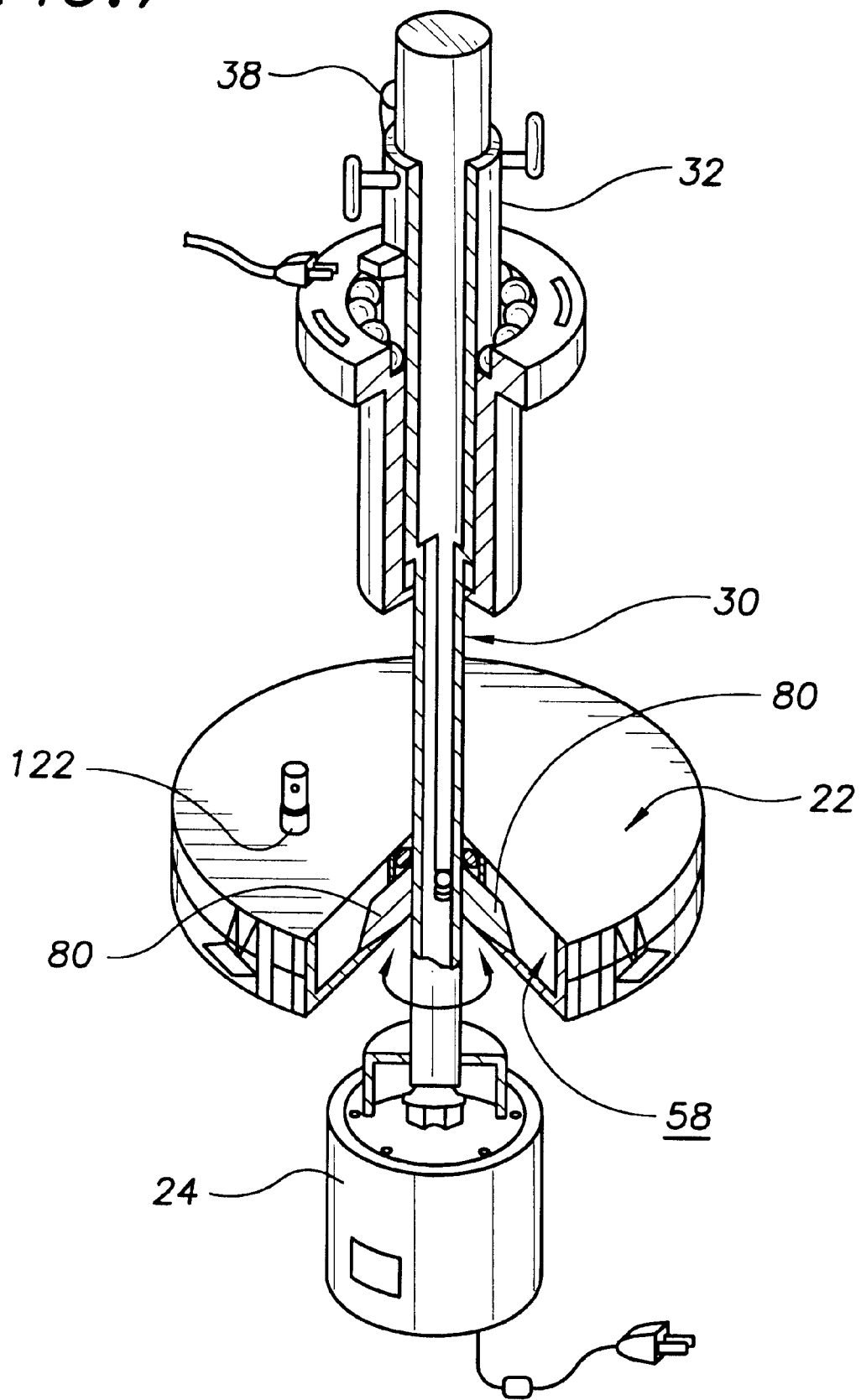
FIG. 7 is a partial cutaway perspective view of the rotating Christmas tree stand of FIG. 1 with the three legs and the leg support ring removed showing the trunk receiving support cylinder rotatably supported within the support canister and the tubular drive shaft installed through the shaft aperture of the support canister, through the detachable reservoir assembly, and in connection with the drive motor; the trunk receiving support cylinder having the trunk of a representative Christmas tree installed therein.

With reference to FIG. 7, during operation of Christmas stand 10 (FIG. 1), tubular drive shaft 30 and trunk receiving cylinder 32 are rotated by drive motor 24. The remainder of Christmas tree stand 10 (FIG. 1) remains stationary. Fluid is added to detachable fluid reservoir 22 and tree trunk receiving cavity 110 (FIG. 6) by pouring the fluid into funnel shaped fill lip 38 with the air vent valve 122 of the detachable fluid reservoir 22 in the open position. When detachable fluid reservoir 22 is filled with fluid, air vent valve 122 is closed and the remainder of the fluid is added to fill tree trunk receiving cavity 110 (FIG. 6). As tubular drive shaft 30 rotates, mixing blades 80 rotate creating a mixing action within reservoir chamber 58 of detachable fluid reservoir 22 that mixes the fluid with the fertilizing agents.

It can be seen from the preceding description that a rotating Christmas tree stand has been provided that includes a rotating electric supply socket to provide electrical power to the lights decorating the Christmas tree; that includes a fluid reservoir for supplying fluid to the Christmas tree; that includes a mixing mechanism for mixing fertilizing agents into the fluid within a fluid reservoir; and that includes a stand assembly and a rotating tree support assembly rotatably supported on the stand assembly; the stand assembly including support legs, a leg support ring, a support canister, a detachable fluid reservoir assembly, and an electric drive motor; the leg support ring being secured to a mid-portion of each of the support legs; the support canister being attached to an upper end of each of the support legs and including a cylinder receiving cavity, an upper canister bearing assembly, a support canister fluid level viewing window, a lower canister bearing assembly, and a shaft aperture; the detachable fluid reservoir assembly including a lower reservoir member, an upper reservoir member, a mixing blade assembly, a lower reservoir bearing, a lower seal, an upper seal, an upper reservoir bearing, a plurality of reservoir locking buckles for securing the upper reservoir member to the lower reservoir member, and an air vent valve provided on the upper reservoir member for releasing air from a reservoir chamber formed by an upper chamber cavity of the upper reservoir member and a lower chamber cavity of the lower reservoir member; the mixing blade assembly including a number of mixing blades radiating from a friction fitting; the rotating tree support assembly including a tubular drive shaft and a trunk receiving support cylinder; the trunk receiving support cylinder including a receiving cylinder water level viewing window, a trunk receiving cavity, a tree support base extending upwardly into the trunk receiving cavity, a plurality of trunk securing screw mechanisms, and an electric supply socket; the tubular drive shaft including a fluid passageway formed along an upper portion of the tubular drive shaft and into fluid communication with the trunk receiving cavity of the trunk receiving support cylinder, a fluid flow hole formed through the sidewall of the tubular drive shaft and into connection with the fluid passageway, two circumferential conductor contacts formed around a lower shaft end of the tubular drive shaft, two electrical conductors routed through the wall of the tubular drive shaft and in electrical connection between the circumferential conductor contacts and the electric supply socket, and a solid lower shaft end sealing the lower end of the fluid passageway; the electric drive motor including two contact brushes and a shaft coupling ring; one contact brush being in sliding electric contact with each of the conductor contacts; the shaft coupling ring detachably coupling the drive motor to the tubular drive shaft; an upper end of the tubular drive shaft being integrally formed with the trunk receiving support cylinder; the cylinder receiving cavity of the support canister being sized to receive at least a portion of the tree receiving support cylinder therein.

It is noted that the embodiment of the rotating Christmas tree stand described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A rotating Christmas tree stand comprising:

a stand assembly and a rotating tree support assembly rotatably supported on said stand assembly;

said stand assembly including support legs, a leg support ring, a support canister, a detachable fluid reservoir assembly, and an electric drive motor;

said leg support ring being secured to each of said support legs;

said support canister being attached to an upper end of each of said support legs and including a cylinder receiving cavity, an upper canister bearing assembly, a lower canister bearing assembly, and a shaft aperture;

said detachable fluid reservoir assembly including a lower reservoir member, an upper reservoir member, a mixing blade assembly, a lower reservoir bearing, a lower seal, an upper seal, an upper reservoir bearing, a plurality of reservoir locking buckles for securing said upper reservoir member to said lower reservoir member, and an air vent valve provided on said upper reservoir member for releasing air from a reservoir chamber formed by an upper chamber cavity of said upper reservoir member and a lower chamber cavity of said lower reservoir member;

said mixing blade assembly including a number of mixing blades radiating from a friction fitting;

said rotating tree support assembly including a tubular drive shaft and a trunk receiving support cylinder;

said trunk receiving support cylinder including a trunk receiving cavity, a tree support base extending upwardly into said trunk receiving cavity, a plurality of trunk securing screw mechanisms, and an electric supply socket;

said tubular drive shaft including a fluid passageway formed along an upper portion of said tubular drive shaft and into fluid communication with said trunk receiving cavity of said trunk receiving support cylinder, a fluid flow hole formed through said sidewall of said tubular drive shaft and into connection with said fluid passageway, two circumferential conductor contacts formed around a lower shaft end of said tubular drive shaft, two electrical conductors routed through said wall of said tubular drive shaft and in electrical connection between said circumferential conductor contacts and said electric supply socket, and a solid lower shaft end sealing said lower end of said fluid passageway;

said electric drive motor including two contact brushes and a shaft coupling ring;

one contact brush being in sliding electric contact with each of said conductor contacts;

said shaft coupling ring detachably coupling said drive motor to said tubular drive shaft;

said cylinder receiving cavity of said support canister being sized to receive at least a portion of said tree receiving support cylinder therein;

said fluid flow hole being in fluid communication with said reservoir chamber.

2. The rotating Christmas tree stand of claim 1, wherein:

said leg support ring is secured to a mid-portion of each of said support legs.

3. The rotating Christmas tree stand of claim 2, wherein:

an upper end of said tubular drive shaft is integrally formed with said trunk receiving support cylinder.

4. The rotating Christmas tree stand of claim 3 further including:

a remote control mechanism including a remote receiving unit coupled in controlling connection with said drive motor and a hand held remote control transmitter unit.

5. The rotating Christmas tree stand of claim 4 wherein:

said support canister further includes a support canister fluid level viewing window; and said trunk receiving support cylinder further includes a receiving cylinder water level viewing window.

6. The rotating Christmas tree stand of claim 3 wherein:

said support canister further includes a support canister fluid level viewing window; and said trunk receiving support cylinder further includes a receiving cylinder water level viewing window.

7. The rotating Christmas tree stand of claim 2 further including:

a remote control mechanism including a remote receiving unit coupled in controlling connection with said drive motor and a hand held remote control transmitter unit.

8. The rotating Christmas tree stand of claim 7 wherein:

said support canister further includes a support canister fluid level viewing window; and said trunk receiving support cylinder further includes a receiving cylinder water level viewing window.

9. The rotating Christmas tree stand of claim 2 wherein:

said support canister further includes a support canister fluid level viewing window; and said trunk receiving support cylinder further includes a receiving cylinder water level viewing window.

10. The rotating Christmas tree stand of claim 1, wherein:

an upper end of said tubular drive shaft is integrally formed with said trunk receiving support cylinder.

11. The rotating Christmas tree stand of claim 10 further including:

a remote control mechanism including a remote receiving unit coupled in controlling connection with said drive motor and a hand held remote control transmitter unit.

12. The rotating Christmas tree stand of claim 11 wherein:

said support canister further includes a support canister fluid level viewing window; and said trunk receiving support cylinder further includes a receiving cylinder water level viewing window.

13. The rotating Christmas tree stand of claim 10 wherein:

said support canister further includes a support canister fluid level viewing window; and said trunk receiving support cylinder further includes a receiving cylinder water level viewing window.

14. The rotating Christmas tree stand of claim 1 further including:

a remote control mechanism including a remote receiving unit coupled in controlling connection with said drive motor and a hand held remote control transmitter unit.

15. The rotating Christmas tree stand of claim 14 wherein:

said support canister further includes a support canister fluid level viewing window; and said trunk receiving support cylinder further includes a receiving cylinder water level viewing window.

16. The rotating Christmas tree stand of claim 1 wherein:

said support canister further includes a support canister fluid level viewing window; and said trunk receiving support cylinder further includes a receiving cylinder water level viewing window.

* * * * *